United States Patent [19]

Ogata et al.

[11] Patent Number: 5,957,398
[45] Date of Patent: Sep. 28, 1999

[54] COMPOSITE CERAMIC MATERIALS AS A PULVERIZATION MEDIUM AND FOR WORKING PARTS OF A PULVERIZER

[75] Inventors: Tomohiko Ogata; Minoru Takuwa, both of Shiga-ken; Shouichiro Goto, Hyogo-ken; Shin-ichi Itou; Yasuhiro Nakano, both of Shiga-ken; Toru Tsurumi, Kyoto-fu, all of Japan

[73] Assignee: Toray Industries, Inc., Tokyo, Japan

[21] Appl. No.: 08/870,646

[22] Filed: Jun. 6, 1997

[30] Foreign Application Priority Data

Jun. 7, 1996 [JP] Japan .................................. 8-145538
Jun. 13, 1996 [JP] Japan .................................. 8-152428

[51] Int. Cl.⁶ ............................. B02C 17/16; B02C 17/20
[52] U.S. Cl. ............................. 241/27; 241/170; 241/172; 241/179; 241/184
[58] Field of Search .................................. 241/170, 171, 241/179, 184, 172, 27, 29, 30

[56] References Cited

U.S. PATENT DOCUMENTS

| | | | |
|---|---|---|---|
| 3,830,435 | 8/1974 | Hill | 241/27 |
| 3,904,140 | 9/1975 | Defosse et al. | 241/30 |
| 4,430,279 | 2/1984 | Hagio et al. | 264/65 |
| 4,579,587 | 4/1986 | Grant et al. | 75/0.5 R |
| 5,329,984 | 7/1994 | Newkirk et al. | 164/98 |
| 5,544,817 | 8/1996 | Brownbridge et al. | 241/21 |

FOREIGN PATENT DOCUMENTS

| | | |
|---|---|---|
| 0 435 677 A2 | 7/1991 | European Pat. Off. . |
| 0 729 927 A1 | 9/1996 | European Pat. Off. . |
| 0 786 441 A1 | 7/1997 | European Pat. Off. . |
| 2 094 779 | 9/1982 | United Kingdom . |

OTHER PUBLICATIONS

J. Kishino et al.: "Mechanical properties of sinter–forged $Al_2O_3$–$ZrO_2$ ceramics" Journal of Materials Science, vol. 31, Sep. 15, 1996, London, GB, pp.: 4991–4995.

Patent Abstracts of Japan, vol. 17, No. 93 (C–1029), Feb. 24, 1993 and JP 04 285063 A (Toray Ind Inc), Oct. 9, 1992, abstract only.

Database WP1, Week 40, Derwent Publications Ltd., London, GB; AN89–289260 (XP002061080 and JP 01 212 273 A (Hitachi Chem Co. Ltd), Aug. 25, 1989, abstract only.

A. Leriche et al.: "Preparation and characterization of a dispersion toughened ceramic for thermomechanical uses (ZTA)" Jourdan of the European Ceramic Society, vol. 9, No. 3, 1992, Essex, GB, pp.: 169–176, XP002061078.

P. Homerin et al.: "Mechanical properties of zirconia toughened alumina prepared by different methods" Jourdan de Physique, vol. 47, No. 2, Feb. 1986, Paris, FR, pp.: 717–721, XP002061079.

Database WP1, Week 25, Derwent Publications Ltd., London, GB; AN91–183143, XP002061081 and JP 03 112 854 A (Osaka Cement Co. Ltd.), May 14, 1991, abstract only.

*Primary Examiner*—John M. Husar
*Attorney, Agent, or Firm*—Morrison & Foerster

[57] ABSTRACT

A pulverizer for pulverizing a product has a container and at least one working part within the container, which may contain a pulverizing medium. At least one of (1) an inner liner of the container, (2) an outer shell of the working part and (3) an outer shell of the pulverizing medium is formed from a composite ceramic material containing aluminum oxide material as a main component, and zirconium oxide material in an amount of 15–40 wt. %. At least one of $Y_2O_3$ and $CeO_2$ is present in the zirconium oxide material in an amount of 0.1–5 mol %. A pulverizer may comprise at least one of a working part of the pulverizer and a container having a Vickers hardness (Hv) of 1300 kgf/mm² or higher, and a pulverizing medium whose Vickers hardness (Hv) is 100–600 kgf/mm² lower than that of the Vickers hardness of said at least one of the working part and the container member.

30 Claims, 7 Drawing Sheets

COMPOSITE CERAMIC MATERIALS AS A PULVERIZATION MEDIUM AND FOR WORKING PARTS OF A PULVERIZER

FIELD OF THE INVENTION

The present invention relates to a composite ceramic material suitable for use as a pulverizing medium and/or for providing abrasional parts of a pulverizer, namely at least an inner liner of a container, and/or at least an outer shell of at least one working part of a pulverizer, which pulverizing media and working parts are hereinafter referred to as "pulverizer members". More particularly, the invention relates to a wet or dry type pulverizer and abrasion resistant members of the pulverizer that are used for crushing, grinding, mixing and dispersing raw materials in industrial fields dealing with powders, such as magnetic recording materials, electronics materials, chemicals, paints, pigments, cosmetics, foods, fodder and fertilizers. The ceramic-employed abrasion resistant members of the invention are suitable for various applications, for example, as the pulverizing medium, a ball, a container, a container internal lining, and a screen of a screen ball mill that slurries a pulverized material using a pulverizing medium alone or together with a working part associated with the pulverizer such as an agitating member, or a part of an agitating member such as an agitating pin or an agitating disc, and separates the slurry and the pulverizing medium, and a container, a container internal lining, working parts associated with a container such as an agitating screw, an agitating bar, a screen, a rotary disc and a pin and a pulverizing medium such as a ball, a pebble or a bead of a media agitating type mill such as an attrition mill, and a roller, a pulverizing container internal lining of a roller mill, and a pin rotor of a pin mill, and a rotor or a blade of a disc mill, and a rotary disc of a colloid mill, and other applications, for example, pump component parts, bearing component parts, die component parts, including mechanical seals and rollers.

BACKGROUND OF THE INVENTION

Various pulverizers are widely used, for example, a media agitating pulverizer such as a conventional ball mill or an improved type of pulverizer which has working parts associated with the pulverizer such as agitator pins or discs that move pulverizing media, such as balls, beads and pellets, and pulverizes a material utilizing impact, friction and compression forces produced by the kinetic energy of the media, a roller mill that pulverizes a material utilizing compression force produced by a roller, a jet mill that pulverizes a material utilizing impact force produced by forcing the material to strike the internal lining at a high speed, a hammer mill or a pin mill or a disc mill that pulverizes a material utilizing impact produced by rotation of a rotor to which a pulverizing medium, for examples, a hammer, a blade or a pin is fixed or a colloid mill that utilizes shearing force.

In particular, a wet media agitating type pulverizer achieves a high pulverizing efficiency and is highly suitable for fine pulverization at a sub-micron level. In this type conventional pulverizer, the aforementioned members, such as a slit bar, an agitating pin, an agitating disc, a sleeve or a collar, are formed from metals and, more specifically, formed mainly from ordinary structure-purposed rolled steel materials specified by JIS G4305, 3101 including SUS304. The screen, having wedge wire type slits, is integrally formed by joining each slit bar individually to a base by brazing. For an improved abrasion resistance, the hardness of the surfaces of the slit bars is increased by induction quenching, thermal spraying of stellite, or other measures. It is well known that pulverizer members formed from materials other than the aforementioned metals, including natural stones such as agate, ceramics such as alumina ceramic or zirconia ceramic, resins and hard metals have also been used in recent years.

However, the members formed from materials as mentioned above have problems in that they easily abrade and large amounts of abrasional debris contaminate the material to be pulverized, thereby degrading the properties and qualities of the pulverized material and various materials produced from the pulverized material. The problem of contamination with abrasional debris becomes serious particularly if the pulverized material is used for so-called high tech materials such as fine ceramic materials, magnetic materials ad electronics materials.

To solve the problems, JP-A-04-285063 proposes a member for use in a pulverizer formed from a material having well-balanced properties needed for a material of members of a pulverizer, in particular, abrasion resistance, strength and toughness. More specifically, the member is formed from a ceramic containing $Al_2O_3$ as a main component, $ZrO_2$ within a range of 20–40 wt. % with at least 50 vol. % of the crystal structure being tetragonal, $TiO_2$ within a range of 1–5 wt. %, and MgO within a range of 0.1–1 wt. %, wherein the average crystal grain diameter of $Al_2O_3$ is within a range of 1.5–5 $\mu$m and wherein at least 80% of the $Zr_2O$ is present in the grain boundary of $Al_2O_3$. However, this member is not sufficient in the hardness, strength and toughness that are needed for a member of a pulverizer, causing problems with abrasion resistance and impact resistance in practical use.

OBJECT OF THE INVENTION

To meet a recent demand for enhanced dispersion of pulverized particles, the performance of pulverizers has been improved by using ceramic media for pulverization. However, use of ceramic media increases the abrasion of conventional abrasional parts formed of metallic materials, such as a screen, a pulverizing pin or a disc. In a severe case, a slit portion abrabes to an unusable condition requiring replacement of a screen within a period as short as one month. Thus, an increased replacement cost and a reduced operating rate resulting from an increased replacement frequency have increased the running cost in the production of pulverized materials.

Moreover, since abrasional debris from pulverizer members contaminates products, decreased quality of products has become a problem. For example, in electronics materials or magnetic materials, contaminants by abrasion have caused problems of variations in, for example electrical or magnetic properties. In paints, a subtle change in color tone has become a problem.

In addition, since a vessel, i.e., a pulverizing container, and a sleeve and a collar in a pulverizer, i.e., pulverization driving members, receive impacts from a pulverizing media, their internal or external wall portions are likely to break and fall off during use for many hours and in an extreme case, cracking occurs in at least a part of a member and destruction of the entire body of the member may result. If a ceramic of a low hardness is used in such a wall portion or member, the ceramic part will rapidly abrade and deform to an unusable extent in a very short period of time.

The present invention seeks to solve these problems. Thus the invention seeks to provide working parts such as a pulverizing pin, a pulverizing disc, a collar, a sleeve and a screen that are excellent in abrasion resistance, corrosion resistance and chemical resistance, and that cause no deterioration of the electrical or magnetic properties of a product and have no distortion but high dimensional precision.

In addition, ceramic media for pulverization vary considerably in quality, partially because of their short history of practical use. Even if pulverization is performed under the same operating conditions, it is often observed that the pulverized materials differ in particle diameter or particle-size distribution. Thus, it is not easy at present to establish a process management.

By research and study for abrasion resistant members of a pulverizer that have none of the forgoing drawbacks, the invention as described below has been accomplished.

SUMMARY OF THE INVENTION

According to an aspect of the invention, there is provided a pulverizer, preferably of the medium agitating type in which a pulverizing medium is agitated by an agitating member, which pulverizer comprises (a) a container, (b) a pulverizing medium within the container and (c) optionally at least one working part associated with the pulverizer and within the container, in which pulverizer at least one of (1) at least an outer shell of a working part of the pulverizer, (2) at least an outer shell of the pulverizing medium and (3) at least an inner lining of the container is formed from a composite ceramic material cantaining a crystalline aluminum oxide material as a main component, preferably at least 50 wt. %, more preferably 60–85 wt. % and a crystalline zirconium oxide material in an amount of 15–40 wt. % based on the weight of the ceramic material wherein at least one of $Y_2O_3$ and $CeO_2$ is present in the crystalline zirconium oxide material in an amount of 0.1–5 mol % based on the total crystalline zirconium oxide material. The composite ceramic material may be a material wherein an average crystal grain diameter of at least one of zirconium oxide and aluminum oxide is 2 $\mu$m or smaller, and wherein at least 50% by volume of the zirconium oxide is present as tetragonal crystal. Thus, the pulverizer may comprise a container and a pulverizing medium alone or may additionally comprise a working part, such as an agitating member which is associated with the pulverizer and actuates the pulverizing medium, or has a separating function such as a screen.

According to another aspect of the invention, there is provided a pulverizer, preferably of the type in which a pulverizing medium is agitated, hereinafter referred to as a "media agitating pulverizer" comprising at least one of a working part, preferably an agitating member of the pulverizer and a container member of a pulverizer that have a Vickers hardness (Hv) of 1300 kgf/mm² (12.75 GPa) or higher, and a pulverizing medium whose Vickers hardness is 100–600 kgf/mm² (1–5 GPa) preferably 100–500 kgf/mm² (1–5 GPa) more preferably 200–400 kgf/mm² (2–4 GPa) lower than the Vickers hardness of the at least one of the working part and the container member. The Vickers hardness of the at least one of the working part and the container member may preferably be 1650 kgf/mm² (16.2 GPa) or higher, with the Vickers hardness of the pulverizing medium preferably being 100–500 kgf/mm² lower than that of the at least one of the working part and the container member.

According to still further aspects, the invention provides (1) a sintered composite ceramic material comprising a crystalline aluminum oxide material and a crystalline zirconium oxide material, which crystalline aluminum oxide material is present in an amount of from 60–85 wt % and which crystalline zirconium oxide material is present in an amount of 15–40 wt % based on the total weight of the composite ceramic material, and which crystalline zirconium oxide material contains additionally at least one of $Y_2O_3$ and $CeO_2$ in an amount of 0.15–5 mol % based on the total zirconium oxide material; and (2) a sintered composite ceramic material comprising a crystalline aluminium oxide material and a crystalline zirconium oxide material, which crystalline alumimum oxide material is present in an amount of at most 40 wt % and which crystalline zirconium oxide material is present in an amount of at least 60 wt %, based on the total weight of the composite ceramic material, and which crystalline zirconium oxide material contains additionally at least one of $Y_2O_3$ and CeO in an amount of 1.5–5 mol % based on the total zirconium oxide material.

BRIEF DESCRIPTION OF THE DRAWINGS

A preferred pulverizer and working parts thereof embodying the invention will now be described in more detail with reference to the accompanying drawings in which:

FIGS. 4-*a* and 4-*b* show respective agitating pins for use in a pulverizer of FIG. 1;

FIGS. 6-*a* and 6-*b* show schematically respective forms of agitating disc for use in a pulverizer of FIG. 1.

Figure 1:
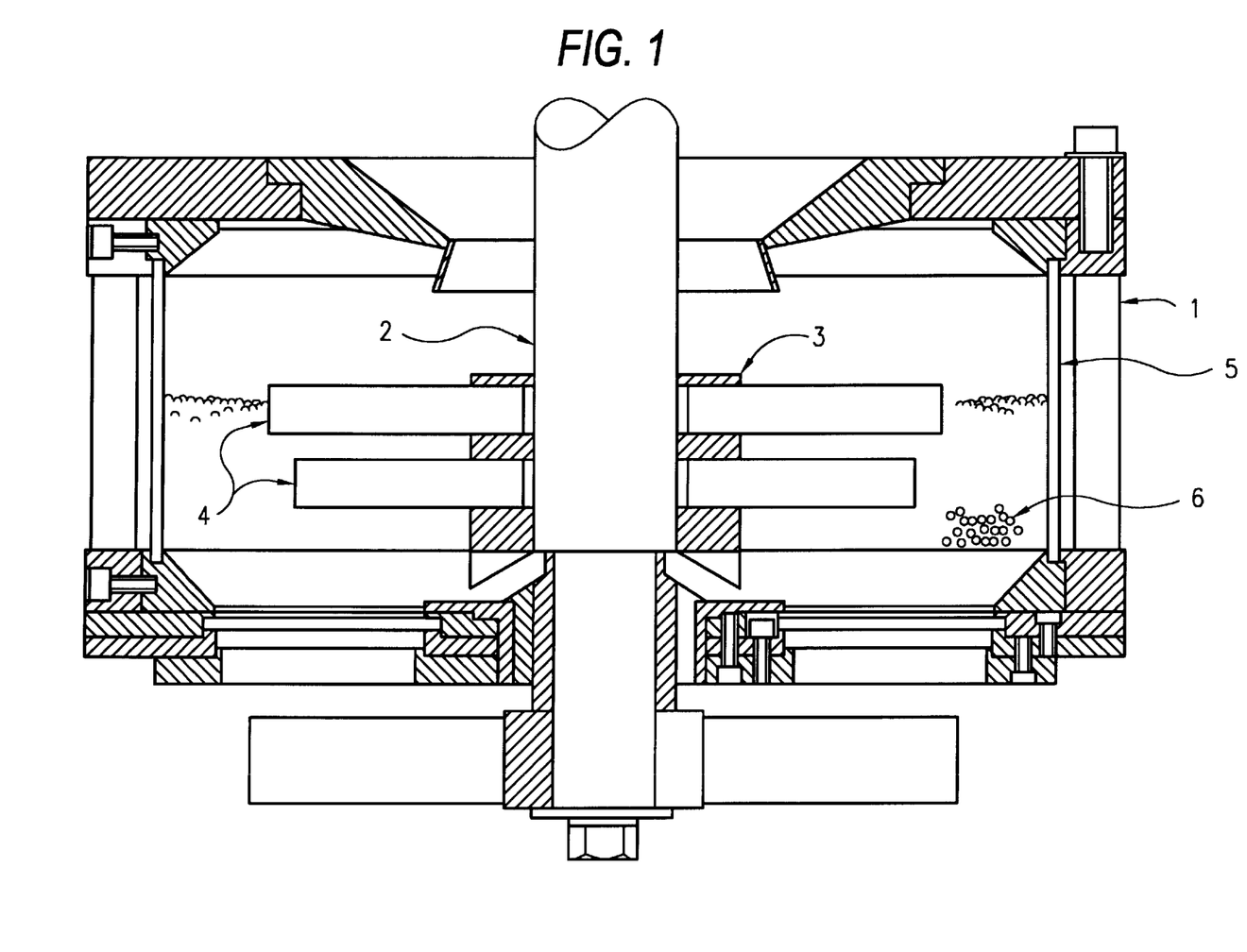
FIG. 1 is a diagrammatic cross-section of a medium agitating pulverizer embodying the invention.

As described in more detail below, the media agitating pulverizer shown in FIG. 1 includes a container member 1 and, as respective working parts thereof, an agitator shaft 2, a sleeve 3, a pulverizer pin 4, a screen 5, a base 7, slit bars 8, reinforcing bars 9, an agitator disc 10 and collar 11. A pulverizing medium 6 is present in the container member.

DETAILED DESCRIPTION OF THE PREFERRED EMBODIMENTS

Particular embodiments of the pulverizing media and the working parts, especially the agitating member, of a pulverizing and/or the container member of a pulverizer of the present invention will be described in detail hereinafter.

Kinds of Powder and Synthesizing Method

Zirconyl oxychloride of a purity of 99.9% and a yttrium chloride solution are mixed so that the mole ratio of zirconia ($ZrO_2$) to yttria ($Y_2O_3$) becomes 95:5 to 98:2. From the thus-prepared mixture solution, a zirconia precursor is obtained by a hydrolysis method of providing crystalline hydrated zirconia in an autoclave set to about 100° C., or a neutralization co-precipitation method of co-precipitating amorphous zirconium hydroxide and yttrium hydroxide by decreasing the solubility by naturalization with addition of, for example aqueous ammonia. The zirconia precursor is then fired, thereby producing a high-strength zirconia powder material.

Characteristics and Properties of the Powder

The primary particle diameter of the powder is affected by the firing temperature. If the powder is fired at 800–1000° C., the primary particle diameter is distributed in a range of 0.01–0.2 $\mu$m, and the average primary particle diameter becomes about 0.1 μm. The secondary particle diameter is measured by a laser diffractometry. Pulverization may be performed so that the secondary particle diameter is distributed in a range of 0.01 to 30 μm and the average secondary particle diameter becomes within a range of about 0.05 to 2 μm.

Preparation of Mixed Powder Slurry

Preparation of a composite powder containing alumina will be described.

$Al_2O_3$ powder having an average particle diameter of 0.01–2.0 μm and a purity of 99.0% or higher is mixed with $ZrO_2$ powder containing 1.5–5 mol % yttria and/or ceria and having an average particle diameter of 0.03–1.0 μm are mixed at a predetermined ratio, thereby producing a mixed powder. The mixing operation may be performed in either a wet method or a dry method. After being dried if necessary, the mixed powder is roughly crushed and ground, and then sieved or granulated. It is preferred that the average particle diameter of the $Al_2O_3$ powder be within a range of 0.3 μm to 2 μm, because high density firing becomes possible. The average particle diameter of the $ZrO_2$ powder is preferably 1 μm or less for providing a uniform dispersion in $Al_2O_3$. It is also preferred that the purity of each powder mentioned above be 99% or higher in order to prevent abnormal crystal grain growth by impurities and further improve mechanical characteristics such as strength, hardness and fracture toughness. The pulverization is preferably performed to an extent where the $Al_2O_3$ average particle diameter within a range of 0.3 μm to 2 μm becomes about 0.3 μm to about 1.2 μm, or the $ZrO_2$ average particle diameter within a range or 0.3 μm to 2 μm becomes about 0.3 μm to about 1.2 μm. The mixing uniformity is preferably achieved to substantially the same extent as the extent achieved by at least one hour operation of a media agitating mill that can achieve an average particle diameter of 0.6 μm by a three-hour wet mixing and pulverizing process in pure water of a combined powder material of 70 wt. % of $Al_2O_3$ powder having an average particle diameter of 0.5 μm and a purity of 99.8% and 30 wt. % of $ZrO_2$ powder containing 3 mol % of $Y_2O_3$ as a stabilizer and having an average particle diameter of 1.0 μm. More preferably, the mixing uniformity extent is substantially the same extent as that achieved by at least two hour operation and, still more preferably, at least three hour operation of the media agitating mill.

Granulation and Molding Methods

There are various methods of producing pulverizing media, such as a compression method, an extrusion method and a tumbling method. In particular, a tumbling granulation method that forms spherical pellets by tumbling powder, and a rotary press method that forms disc-shaped cylindrical pellets by compressing powder are both preferable since they facilitate mass production and cost reduction.

The tumbling method is particularly suitable for production of ball-shaped pulverizing media having a broad range of diameters from about 0.3 mm to 50 mm, since the method forms substantially spherical pellets having a necessary strength by spraying a liquid while tumbling a dry powder material by the effect of a rotary container and agitating blades or a mechanical method employing an oscillating device.

An agitating member of a pulverizer and/or a container member of a pulverizer having a desired configuration can be produced by molding using a rubber press or a mold press. In experiments, members having complicated configurations, such as a vessel, a sleeve, a screen or a pulverizing pin, were formed by rubber pressing and then cutting. A pulverizing disc and other disc-shaped members were formed into near net shapes by mold pressing. In mold pressing, the mold was filled with the aforementioned powder and a pressure of 500 to 4000 kgf/cm² was applied, thereby producing a molding. In rubber pressing, a molding was produced under a pressure of 500 to 2000 kg/cm².

Sintering and Processing Methods

A dense sintered article can be obtained by firing a molding in the atmosphere or an inert atmosphere at a temperature range of 1300 to 2200° C. for 30 minutes to 3 hours. The sintering may be performed by a normal-pressure sintering method, or a pressurized sintering method or a hot press method. In some cases, the preceding molding process is not necessary. The sintering atmosphere is an oxidizing atmosphere such as the atmosphere. The sintering temperature and time are carefully controlled in such a manner the $Al_2O_3$ average crystal grain diameter becomes 2 μm or less and the $ZrO_2$ average crystal grain diameter becomes 2 μm or less and, preferably, in such a manner that the sintered article becomes dense and has a Vickers hardness (Hv) of 1650 kgf/cm² of higher. Furthermore, to prevent rapid $Al_2O_3$ grain growth and thereby prevent reductions in the hardness and strength of the sintered article, the temperature is slowly increased at a rate of 0.5° C./min or slower, near the sintering temperature. After the sintering, however, cooling is performed at a rate of 5° C./min or faster because if the cooling is too slow, a large amount of monoclinic $ZrO_2$ will precipitate. Finish polishing is performed using a double-side honing machine or a barreling machine, to finally obtain mirror surfaces having a maximum roughness of 50 nm or less.

The obtained ceramics are then subjected to machining processes such as cutting or polishing and, if necessary, a mounting process, to producing desired members.

Structures and Properties of Sintered Articles

An alumina-zirconia based composite ceramic, that is, a representative material of the members of a pulverizer and/or the pulverizing media of the present invention, is preferably present in an amount of, although not limited to, 60 to 85% by weight and, more preferably, 65 to 80% by weight. The purity of alumina should preferably be high. The purity of alumina is preferably, but not limited to, 99.8% by weight or higher.

The aforementioned members are, working parts, for example agitating members of a pulverizer and/or container members of a pulverizer that are formed from an alumina-zirconia ceramic material containing zirconium oxide in an amount of 15–40 wt. %, wherein at least one of $Y_2O_3$ and $CeO_2$ is contained in the zirconium oxide in an amount of 0.1–5 mol % relative to the zirconium oxide, and wherein the average crystal grain diameter of aluminum oxide is 2 μm or smaller and the average crystal grain diameter of aluminum oxide is 2 μm or smaller, and wherein at least 50% by volume of the zirconium oxide is present as tetragonal crystal that is metastable at room temperature. It is preferred that the ceramic material have a Vickers hardness (Hv) of 1300 kgf/mm² or higher. If the hardness is less than 1300 kgf/cm², abrasion of a member during use becomes remarkable. Although the mechanism of abrasion of agitating members and/or container members of a pulverizer is not completely clear, it has been widely believed that a member of a high hardness, a high strength and a high toughness has a high abrasion resistance. According to the present invention, it has been found that if an alumina-zirconia material having a hardness of, for example, 1650 kgf/mm² or higher, is used, the hardness, strength and toughness can be improved by precision control of the crystal grain diameter of $Al_2O_3$ and $ZrO_2$ and the crystal configuration of $ZrO_2$ and, further, the Vickers hardness (Hv), which is an important property of a sintered article, instead of control of the alumina-zirconia material itself, thereby enabling production of a pulverizer having an excellent abrasion resistance. Furthermore, it has been found that if pulverizing media whose hardness is 100–500 kgf/mm² lower than that of the pulverizer members is used, the pulverizer members undergo substantially no abrasion during long hour use and the pulverizing media are uniformly abraded, thereby increasing the service life over the conventional art.

In a ceramic material used for a working part such as an agitating member and/or container member of a pulverizer according to the present invention, 15–40 wt. % of zirconia is present. If the zirconium oxide content is less than 15 wt. %, the amount of zirconium oxide that contributes to an increase of strength by the stress induced transformation of zirconium oxide from the tetragonal crystal to the monoclinic crystal is too small, thus failing to achieve a sufficient increase in the strength, which is important in this material. If the zirconium oxide content exceeds 45 wt. %, the zirconium oxide crystal grains aggregate so that the strength decreases, and in addition, the accordingly reduced aluminum oxide content reduces the hardness. Therefore, the zirconium oxide content needs to be 15 to 40 wt. %. A preferred zirconium oxide content is 20 to 35 wt. %.

A crystalline zirconium oxide material present in a ceramic material according to the present invention needs to contain 0.1 to 5.0 mol % of at least one of $Y_2O_3$ and $CeO_2$ based on total crystalline zirconium oxide material present in a ceramic. Preferably, at least one of $Y_2O_3$ and $CeO_2$ is contained as a stabilizer in zirconium oxide in an amount of 1.5 to 5 mol % relative to the amount of zirconium oxide. If the content of $Y_2O_3$ and/or $CeO_2$ is less than 1.5 mol %. the tetragonal crystal in the zirconium oxide is not very much stabilized, and therefore, the proportion of zirconium oxide present as monoclinic crystal at room temperature increases, so that a very high strength may not be achieved. If it exceeds 5 mol %, the tetragonal crystal is likely to be completely stabilized so that stress induced transformation does not occur at room temperature, thus failing to increase the strength. It is more preferred that $Y_2O_3$ be contained as a stabilizer in an amount of 2 to 3.5 mol % relative to the amount of zirconium oxide.

According to the present invention, the average crystal grain diameter of zirconium oxide is preferably 2 μm or less. If the average crystal grain diameter exceeds 2 μm, zirconium oxide transforms into monoclinic crystal, so that the strength does not increase and the hardness does not increase. A more preferred average crystal grain diameter of zirconium oxide is 0.2–0.8 μm, and a still more preferred it is 0.2–0.6 μm.

According to the present invention, the average crystal grain diameter of aluminum oxide is preferably 2 μm or less. If the average crystal grain diameter of aluminum oxide exceeds 2 μm, the hardness decreases. Furthermore, the strength of aluminum oxide matrix will decrease, and the transformation of aluminum oxide into monoclinic crystal cannot be prevented, so that the strength will considerably decrease. A more preferred average crystal grain diameter of aluminum oxide is 0.5–1.5 μm.

According to the present invention, preferably at least 50% by volume of the zirconium oxide is tetragonal crystal that is metastable at room temperature. If the tetragonal crystal is less than 50%, an increase of strength by the stress induced transformation from the tetragonal crystal into the monoclinic crystal cannot be expected. It is more preferred that at least 95% by volume of the zirconium oxide be tetragonal crystal.

According to the present invention, if the Vickers hardness (Hv) of a sintered article is 1650 kgf/cm² or greater, the abrasion resistance further increases. If the Vickers hardness (Hv) is less than 1650 kgf/cm², the performance of a sliding member, i.e., a major application of the material according to the invention, decreases and, in particular, the abrasion resistance of a member of a pulverizer remarkably decreases.

The bending strength of a sintered article is preferably at least 65 kgf/cm². Such a bending strength of a sintered article will provide a pulverizer, especially a media agitating pulverizer, comprising a working part, especially an agitating member, and/or a container member and/or pulverizing media, which is robust and has a large resistance to impact. A more bending strength of a sintered article is at least 80kgf/cm².

It is preferred to use a working part and/or a container member of a pulverizer that is/are formed of a ceramic whose fracture toughness value determined by the single-edge-precracked-beam method according to JIS R 1607 is 3-10 MPa·m$^{1/2}$, and pulverizing media formed of a ceramic whose fracture toughness value is 4–20 MPa·m$^{1/2}$. By this combination, the pulverization members undergo substantially no abrasion during long hour use, and the pulverizing media are uniformly abraded, thereby increasing the service life over the conventional art.

If an external surface of a pulverizer vessel is coated with an impact absorbing material formed of a metal, a plastic, or a wood or a combination of two or more of them, the impact resistance of the vessel improves and the durability increases. A preferable metal is a relatively soft metal such as soft-iron or brass, and a preferable plastic material is a weave impregnated with epoxy resin or acryl resin. By applying such material to the outer cylinder, an internal impact absorption is achieved.

In an abrasion test of ceramic media for pulverization, 200 balls of each ceramic medium, surface-polished by barreling and having diameters of 5–20 mm, were placed in a ceramic-made pot mill of a capacity of 1000 mL, and water and SiC powder of an average particle diameter of 0.5–2 μm were placed in amounts of 20–50% and 1–10%, respectively, relative to the total weight of the media. The pot mill was then operated at a rate of 80–1200 rpm for 20 to 100 hours. After that, the ball weight abrasion loss was calculated.

As for the surface roughness of a sintered article, it is preferred that the maximum surface roughness be 100 nm or less and the central line average roughness be 20 nm or less with respect to a given line of 40 μm in length. With this condition, it was observed that the surface became a near-mirror state, providing a good abrasion resistance. If the average surface roughness of pulverizing media is 10 nm or greater and the maximum surface roughness exceeds 100 nm, the surface becomes excessively rough, thereby impeding efficient pulverization. Furthermore, the surface abrasion will become rapid and the contaminant from the balls will increases. Therefore, the balls preferably have an average surface roughness of 20 nm or less and a maximum surface roughness of 100 nm or less and, more preferably, an average surface roughness of 10 nm or less and a maximum surface roughness of 80 nm or less. It is also preferred that the number of polish scratches of at least 0.5 μm in width, at least 0.2 μm in depth and at least 10 μm in length that are present in a given 50 μm×50 μm square on the surface of pulverizing media be at most two. If a groove-like scratch having a width of 0.5 μm or greater and a depth of 0.35 μm or greater is formed in a polishing process, a piece of material to be pulverized will be stuck in the scratch and form a dead space around it, so that efficient pulverization may be difficult to perform.

A ceramic material suitable for working part of a pulverizer and/or a container member of a pulverizer needs to have an appropriate hardness, an appropriate strength and an appropriate fracture toughness. The hardness is preferably at least 1100 but at most 3000 in terms of Vickers hardness. If the hardness is less than 1100, the material may be too soft and may abrade too fast. If the hardness is greater than 3000, the pulverizing media may abrade excessively fast and the pulverizer members may have cracks.

A sintered article according to the present invention is preferably a high strength ceramic, such as a tetragonal crystal system zirconia containing substantially no monoclinic crystal, which can be determined by crystal structure analysis by powder X-ray diffraction. If is further preferred that the crushing load of balls be at least 200 Newton for a diameter of 0.5 mm, at least 300 Newton for a diameter of 0.7 mm, at least 500 Newton for a diameter of 1.0 mm, and at least 1500 Newton for 2.0 mm.

The method of measuring a surface roughness will be described.

Since the surface roughness of the pulverizing media is at most 0.1 $\mu$m in terms of central line average roughness, the detection precision by a measurement method using a feeler or an optical phase difference method using laser or the like is not sufficiently high for the measurement of the surface roughness according to the invention. A surface roughness measuring method that uses an interatomic force microscope or a scanning electron microscope having a plurality of detectors is preferred since such a method enables precision measurement with a high reproducibility.

A surface roughness measuring method using an interatomic force microscope will be described. The interatomic force microscope is one type of scanning tunnel microscope that three-dimensionally detects a micro-configuration of a sample surface in a non-contact manner, utilizing the van der Waals force occurring between the sample and the probe on the distal end of a cantilever. The probe is a pyramid-shaped protrusion. When a sample is placed near the vertex of the pyramid-shaped probe, an interatomic repulsion force occurs so that the cantilever bends. While the sample height is controlled so that the bending of the cantilever remains unchanged, the sample is scanned horizontally. Using control signals in the direction of height, an image of the three-dimensional configuration of the sample surface can be produced. The bending of the cantilever is detected based on a change in the laser light reflecting direction. Since the interatomic force microscope does not require the coating of a conductive film that is needed for an ordinary-type scanning electron microscope, the interatomic force microscope enables higher precision measurement than an ordinary-type scanning electron microscope.

The construction of a preferred pulverizer according to the present invention will be briefly described with reference to FIG. 1, which illustrates a typical example of the whole construction. The pulverizer is generally made up of a pulverizing container member, an agitating member, and a pulverizing medium 6, for example, of beads. The pulverizing container comprises a container (vessel) (1), and a member 5 called a "screen", for separating pulverized material from the pulverizing medium which screen is cylindrical or disc-shaped. The agitating member comprises agitation driving part, hereinafter called "an agitator" which comprises an agitator shaft (2), agiteter shaft assisting members attached to the agitator shaft (2), namely a collar (11) and a sleeve (3), members fixed to the agitator shaft (2) which apply a force to move a pulverizing medium (6), namely members referred to respectively as a pulverizing disc and pulverizing pins. The pulverizing medium comprises ball-like or pellet-like elements places within the pulverizing container. It is general that a raw material is pulverized and the pulverized material is slurried using the pulverizing medium alone or together with agitation by agitating pins or an agitating disc and separated from the slurry and the pulverizing medium with a screen. In summary, the pulverizer shown in FIG. 1 comprises a pulverizing container member which is a vessel (1), a pulverizing pin (4) fixed to an agitator shaft (2) with a sleeve (3), a separating member, namely a screen (5) which, at the end of pulverization, separates the slurry from the pulverizing medium (6) within the pulverizing container.

In a pulverizer embodying the present invention, abrasional parts include all of the inner surface of the pulverizing container member, the outer surface of the pulverizing parts, for example, the agitating member and the pulverizing medium. In particular, the undesirable abrasion of a slit portion of the screen, an agitating pin, an agitating disc, a sleeve or a collar presents a problem. The invention seeks to achieve a solution to this problem by at least one of the aforementioned abrasional portions constructed from a ceramic material that is excellent in hardness, strength and toughness as described above. However, in particular the ceramic material is preferably used to form an agitating pin or an agitating disc and, more preferably, also a screen, and, still more preferably, additionally a sleeve or collar, of a medium agitator pulverizer thereby achieving the object of invention in a more effective manner. By forming these members (or at least certain parts thereof) from a ceramic material embodying the invention, the durability of the members increases. For prevention of contamination with metallic substances, forming from such ceramic materials as many members as possible is effective.

As mentioned above, according to one aspect of the invention the ceramic material providing at least one of a working part or a container of the pulverizer may be of any material providing a Vickers harness (Hv) of at least 1300 kgf/mm$^2$, or for the pulverizing medium a material whose Vickers hardness (Hv) is 100–600 kgf/mm$^2$ (1–6 GPa) lower than that of the Vickers hardness of the said at least one of the working parts and the container. Examples of the ceramic material are partially stabilized zirconia, especially tetragonal crystal zirconia, zirconia-alumina composite material, silicon nitride, silicon carbide, metallic silicon-containing silicon carbide, alumina and hard metal. Ceramics normally have very high abrasion resistance, compared with metallic materials. In particular, tetragonal crystal zirconia (also referred to as partially stabilized zirconia) and silicon nitride have a high bending strength of 70 to 150 kgf/mm$^2$, and also have high abrasion resistance and a hardness of 1200 to 1800 kgf/mm$^2$ in terms of Vickers hardness. Alumina has a still higher hardness of 1600 to 2000 kgf/mm$^2$ and therefore has a high abrasion resistance to a material of a high hardness. However, because the bending strength of alumina is relatively low, that is, about 50 kgf/mm$^2$, it may especially suitably be used for a relatively small-size member. Alumina-zirconia composite material is an optimal material since it has a bending strength of 80 kgf/mm$^2$, which is higher than that of alumina, and has a high hardness of 1600 kgf/mm$^2$, which means a high abrasion resistance. As for tetragonal crystal zirconia, it is preferred that solid-dissolved Y$_2$O$_3$ of an average grain diameter of 1 $\mu$m or less be present in an amount of 1.5–5 mol %, and the average crystal grain diameter of tetragonal crystal zirconia be 0.5 to 2 μm. The alumina-zirconia composite material (ZTA) is preferably a material containing aluminum oxide as a main component, and 15–40 wt. % $ZrO_2$ wherein at least 50% by volume of the $ZrO_2$ is tetragonal crystal, and wherein the $Al_2O_3$ average crystal grain diameter is 5.0 μm or less and the $ZrO_2$ average crystal grain diameter is 2.0 μm. Such an alumina-zirconia composite material has an excellent heat conductive characteristic due to $Al_2O_3$ and has a high strength. Members of a pulverizer will be individually described below. At first, a screen will be described. A screen present in a pulverizer embodying the present invention is an abrasion resistant member for separating a slurry and pulverizing medium in a pulverizer that slurries a pulverized material, for further pulverization, using the pulverizing medium alone or together with an agitating bar. When using the screen shown in FIG. 2, pulverized material is filtered from the inside to the outside, and the screen consists of a base (7) made of SUS304, slit bars (8) made of zirconia and reinforcing bars (9). The inner periphery of the base (7) is grooved and therein, as many slit bars (8) as are needed are fixed. The slit bars (8) are pressed with spacer plates so that they are not loosened, and mechanically screw-fixed. By fixing in this way, they are fixed firmly so that they are not loosened by the load or impact caused by moving of vibration of pulverising media or pulverizing material. The spacer plates which are arranged circumferentially and are of triangular cross-section assist in fixing the slit bars firmly during operation to the grooves of the base (7) and it is preferably made of a relatively repellent material such as a polyimide. In an ordinary screen which is cylindrical, slit portions are cylindrically arranged around a circumference, extending parallel to the axis of the cylindrical screen, wherein for filtration or screening from the outside to the inside, slit bars are fixed to the external periphery, and for filtration or screening from the inside to the outside, the slit bars are fixed to the internal periphery of the screen. The diameter of the screen is ususally 50 mm to 1m, but of course, other diameters may be adopted. Each member is designed according to a predetermined width of the slit, the necessary strength being calculated from overall design of the pulverizer.

Figure 2:
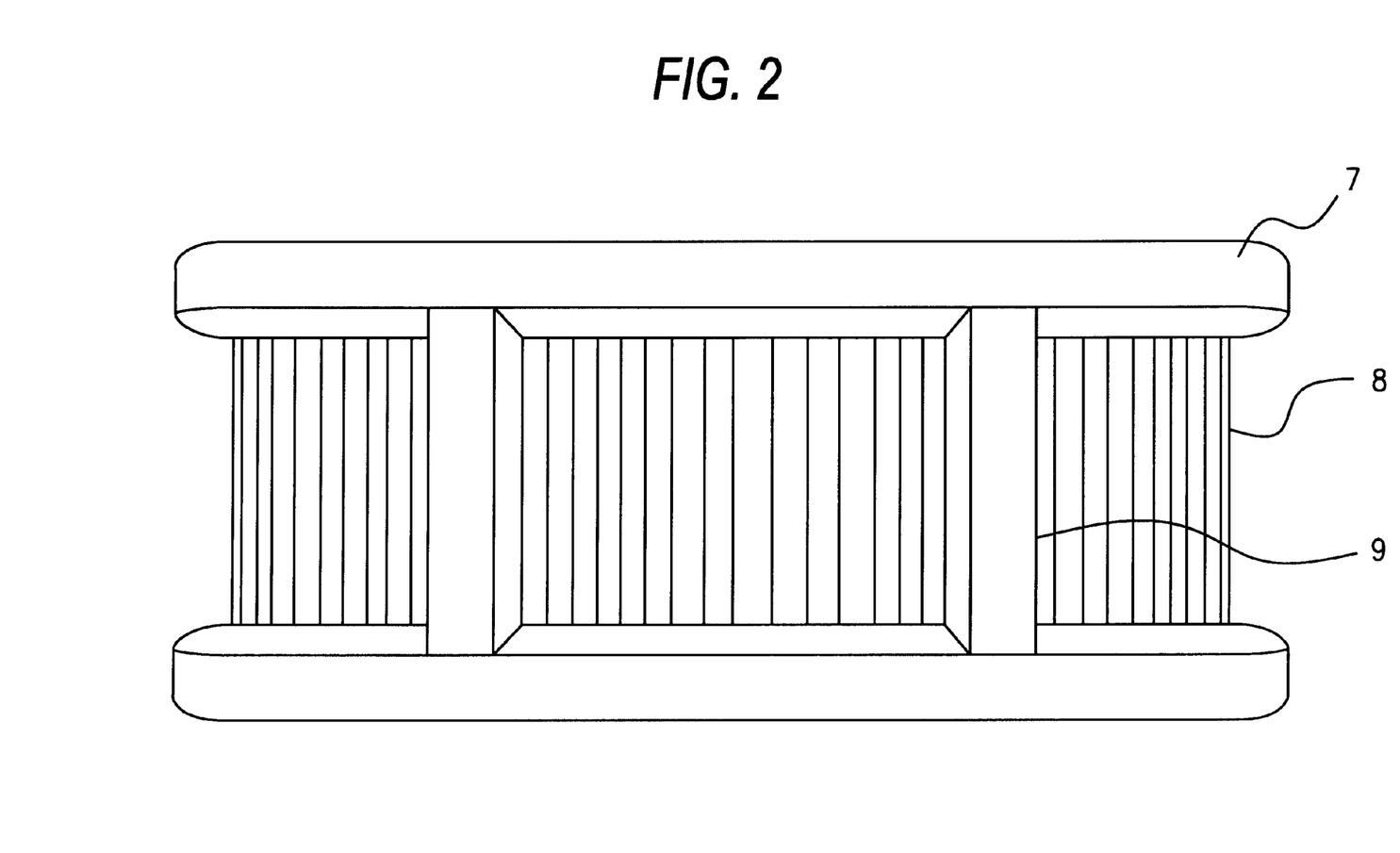
FIG. 2 is a side view of a cylindrical screen for use in a pulverizer of FIG. 1.

The configuration of each slit bar is basically quadrilateral in sectional shape. A sectional shape of the slits bar wherein the incoming side is larger than the outgoing side will reduce the possibility that slits formed between the slit bars will be blocked by the screening pieces. Preferably, the slits have a trapezoidal sectional shape and are disposed with the trapezoid longer base side being on the incoming side, thereby allowing the pieces that have entered slits of the screen to pass through the slits without blocking the slits. A trapezoidal sectional shape has another advantage in that it becomes easy to fasten the slit bars to the base for the fitting. The shorter base side of the trapezoidal sectional shape may be reduced to zero in length, that is, the sectional shape may be triangle. A preferred trapezoidal sectional shape is as follows: longer base side: shorter base side=10:1 to 10:9, and longer base side: height =2:1 to 1:10.

The corner edge portions of slit bars are most subject to abrasion and likely to chip off by an impactive load. It is preferred that the edge portions be chamfered to a C surface of about 0.1–2.0 mm beforehand.

The configuration of the base groove that receives the slit bars is not particularly limited as long as it provides an appropriate fitted depth and an appropriate protruding height of the slit bars. This prerequisite can be achieved by, for example, forming a groove having a depth slightly less than the wall thickness of the slit bars or adjusting the widthwise slope or shape (e.g., a stepped shape) of the groove. If the slit bars have a trapezoidal sectional shape, it is preferred that the groove also have a trapezoidal shape with a slope.

Figure 3:
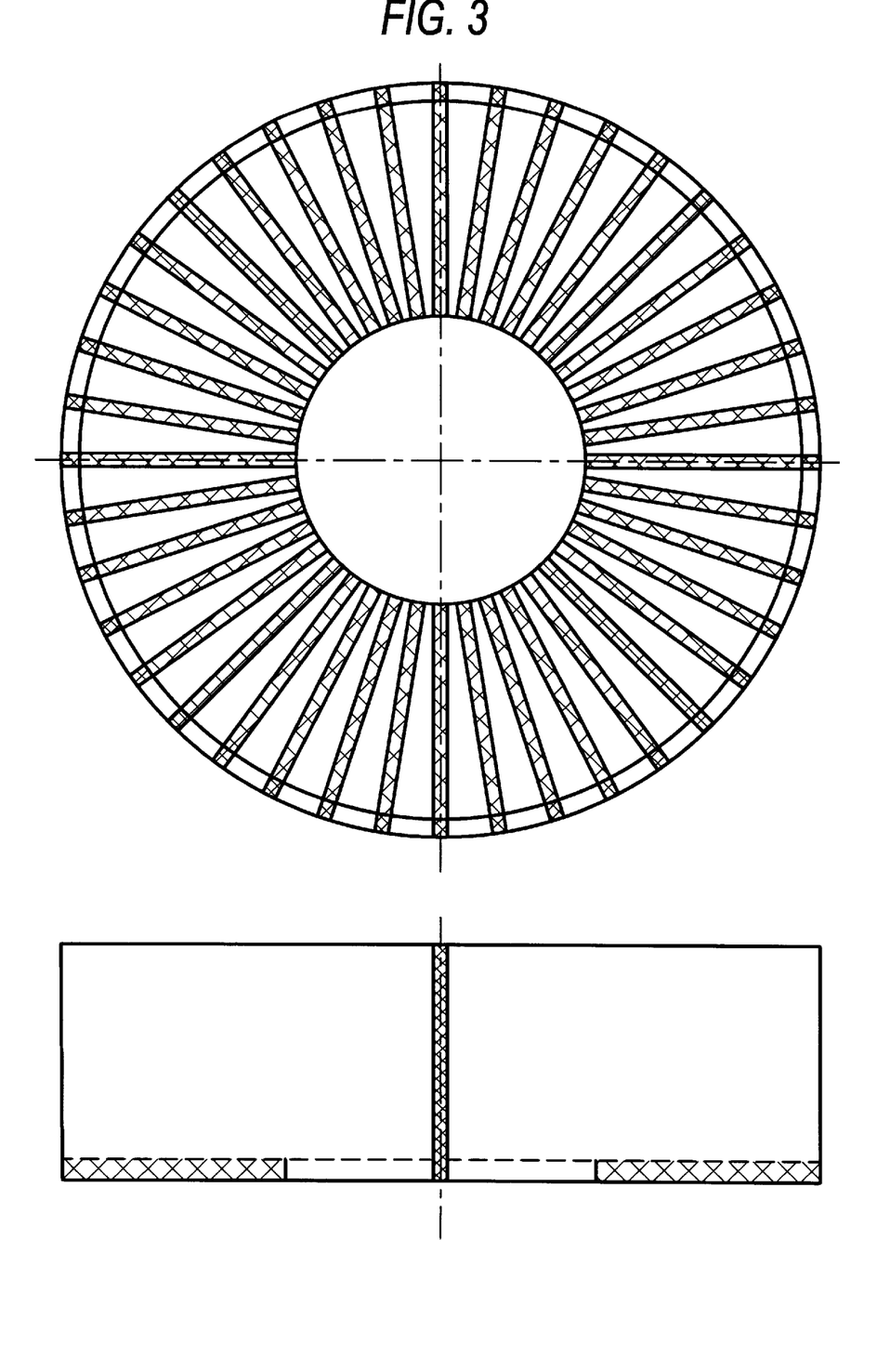
FIG. 3 is a top and side view of disc-shaped screen for use in a pulverizer of FIG. 1.

The above explanations relate to a cylindrical screen. However, a disc-shaped screen may alternatively be used. In the case of a disc-shaped screen, as shown in FIG. 3, slit bars are radially arranged between a central circular base and an outer peripheral ring-like base. In this configuration, it is preferred to use slit bars each having an approximately conical shape that becomes wider toward the radially outward end, in order to equalize the slit widths. In the case of a square-type screen, slit bars are fitted in parallel to a square or angular base, and both ends of each slit bar are fixed. At an outside fitting portion of slits of a disc-shaped screen slit bars may be fixed in an L-shaped cut in the base. In this shape, the ratio of the cutout to the remaining portion is preferably 1.5 to 1:40. In any configuration, the screen according to the present invention forms equal-width slits by fitting into a groove in a base, slit bars having a wall thickness greater than the depth of the groove to be fit. With this construction, the pulverizing medium is screened by highly abrasion-resistant slit bars alone, without directly contacting the base. Furthermore, the slit width is determined by the precision-machined slit bars and the precision-machined groove of the base, and there is no distortion caused by welding or brazing. Therefore, a screen with high dimensional precision can be achieved.

An agitating device that revolves inside the pulverizer is preferably used to effectively agitate pulverizing media and a material to be pulverized. Examples of a typical agitating device are an agitating pin and an agitating disc.

An agitating pin will be described below. As shown in FIG. 1, the agitating pins are preferably supported by a sleeve (3) penetrated by the agitator shaft (2), rather than being directly fixed. The size of the agitating pins 1 is not particularly limited. However, it is preferred that the diameter of the agitating pins be 3–30 mm, and the length be 20–300 mm (or 3–10% of the inside diameter of the container). A distal end portion of each agitating pin is preferably chamfered to a C surface of about 1.5 mm. The number of the agitating pins provided is preferably 4 to 16. The agitating pins may be disposed stepwise along the agitator shaft. Although the agitating pins on the upper and lower steps can be aligned along a line parallel to the longitudinal axis of the agitating shaft, it is preferred that they be disposed in a zigzag or alternate arrangement. The sectional shape of the agitating pins is preferably a circular shape, having regard to durability.

The agitating pins may be fixed in various manners, for example, a manner in which each agitating pin is tightened using another pin (pin-stopped type agitating pins), or a manner in which the agitating pins are threaded (threaded-type agitating pins). Pin-stopped type agitating pins are more preferable than threaded-type agitating pins because of the danger of breaking or chipping off a threaded portion.

Figure 4A:
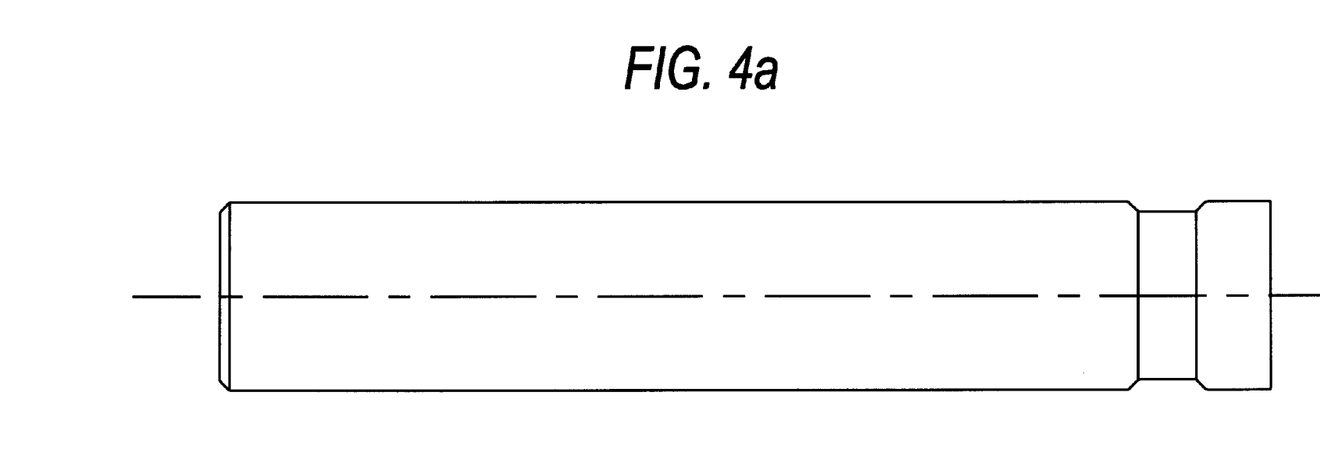

Pin-stopped type agitating pins will be described below. A pin-stopped type agitating pin is tightened using another pin extending perpendicularly to the longitudinal axis of the agitating pin, in a fixed end portion of the agitating pin, for example, a portion located inside the sleeve. A portion of the agitating pin at which tightening is achieved is perferably formed as a pin stop constricted portion, as shown in FIG. 4-a. The diameter of the pin stop constricted portion is preferably about 70–90% of the diameter of the agitating pin. If it is smaller than about 70%, the pin stop constricted portion becomes too narrow and the strength decreases to an undesired level. If it is larger than about 90%, the constriction becomes too shallow to provide a sufficient fixing strength, and there arises a danger that the agitating pin will fall apart. Portions near the pin stop contricted portion are preferably chamfered to a C surface of about C1 to C3 (i.e. where the edges meeting one another each terminate short of providing an apex by from 1 to 3 mm) beforhand. The pin stop constricted portion may be formed only in a location where tightening is actually provided (as a pin stop recess) instead of being formed around the entire periphery. In this manner, however, the position alignment becomes relatively cumbersome. The pin stop recess may be deepened and, further, may be formed as a though hole. In the sleeve used for pin-stopped type agitating pins, for example, an agitating pin is inserted into an agitating pin insert hole. The agitating pin insert hole preferably extends to an agitator shaft-penetrated hole of the sleeve, to make the production easy. If the agitating pin insert hole is a through hole, the base end of each agitating pin reaches the agitator shaft, so that the positioning for lightening becomes easy. The agitating pin thus inserted is fixed by an insert pin inserted in an insert pin hole 22.

Screw blades are provided in a lower end portion of the agitator shaft with the agitating pins to centrifugally move the media or pulverized particles toward an outer peripheral portion. If the pulverizer is large and long in the direction of the agitator shaft two or more screw blades may be provided with two or more collars therebetween.

Figure 4B:
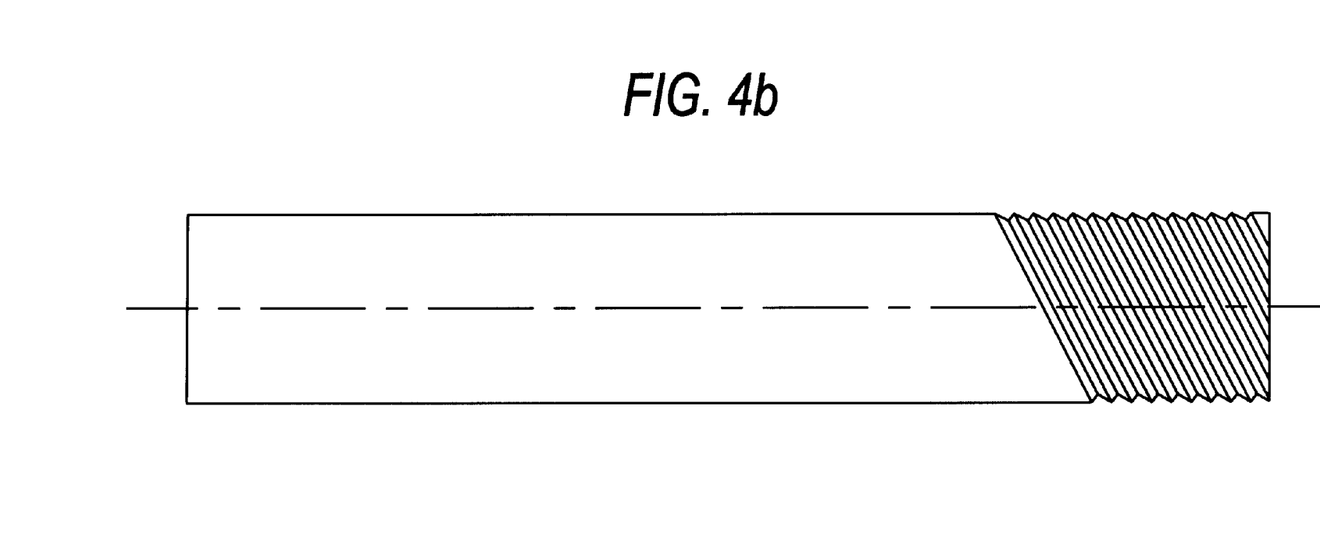
Figure 5:
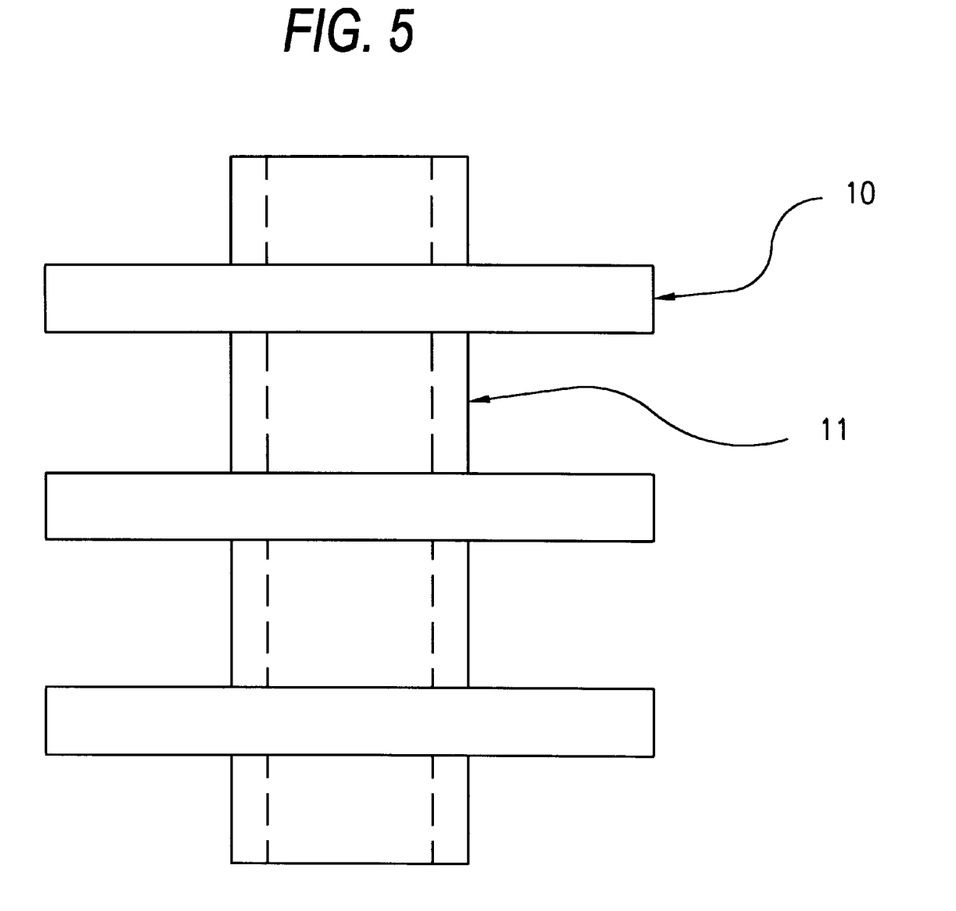
FIG. 5 shows schematically an agitator for use in a pulverizer of FIG. 1.

Threaded-type agitating pins are employed in substantially the same construction as that described above in conjunction with the pin-stopped type agitating pins and the sleeve, except that each agitating pin has a male-threaded portion at an end and each agitating pin insert hole is female-threaded, and that neither an insert pin nor an insert pin hole is provided, as shown in FIG. 4-*b*. It is preferable that a flat surface cutout be provided in order to facilitate the tightening of the agitating pins using a wrench or the like.

Figure 6A:
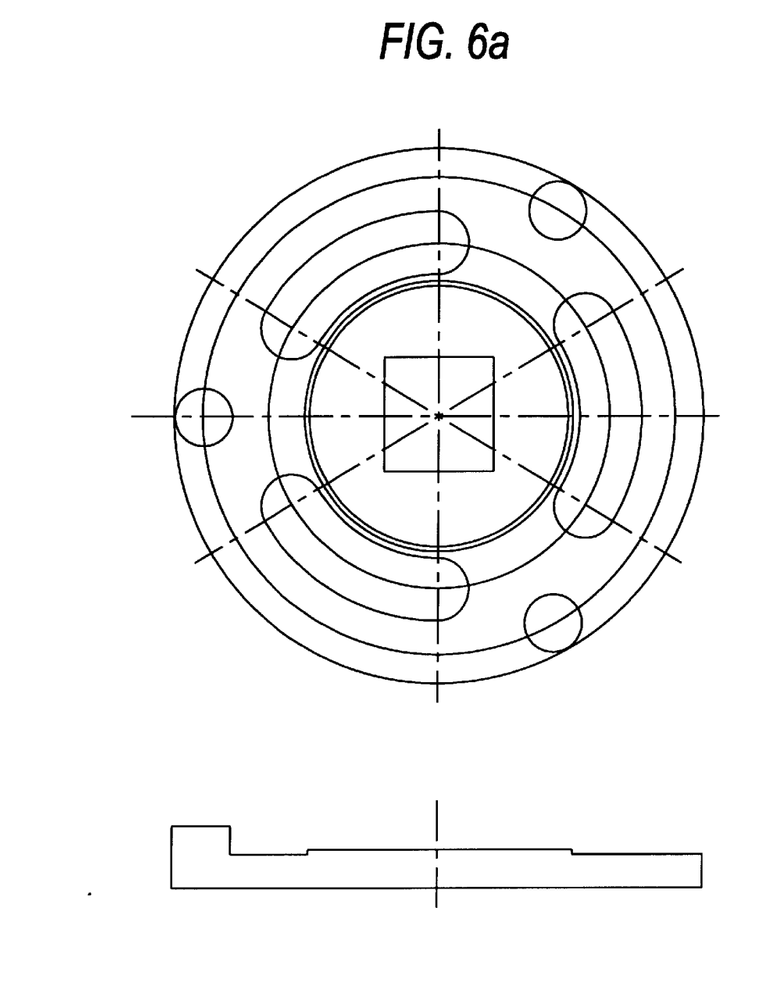
Figure 6B:
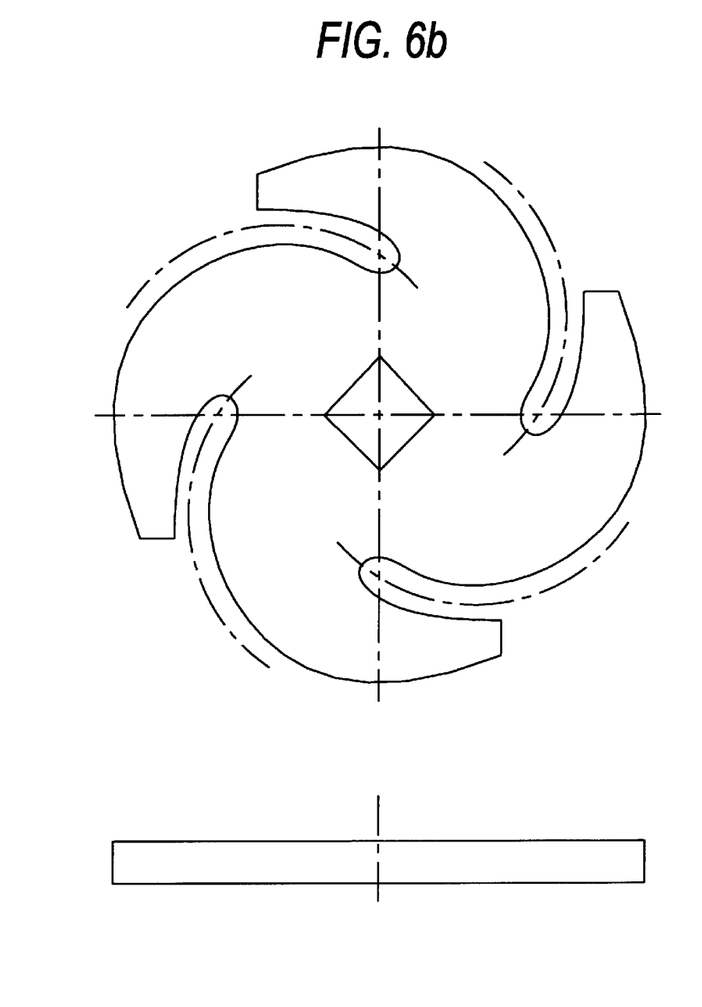

An example of a wheel-type agitating disc is shown in FIG. 6-*a*, wherein a agitator shaft-penetrated hole is formed at the center. As can be seen from the shape of the hole, the sectional shape of the agitator shaft for the agitating discs is preferably of a shape, which is at least not entirely circular, for example, square. If it is a complete circle, there is a danger that sliding will occur between the agitator shaft and a agitating disc during revolution, reducing revolution efficiency. For a weight reduction and an improvement in agitating efficiency, each agitating disc has circumferential holes. The area of the circumferential holes is preferably 10–50% of the entire area of the agitating disc. The number of the holes is preferably two to six. In addition, a slope portion may be formed in the direction of revolution to reduce resistance. Further, the agitating efficiency can be improved by the protrusion of circumferential pin portions. FIG. 6-*b* shows an example of a wind mill-type agitating disc that has circumferential grooves instead of the example of a wind mill-type agitating disc that has circumferential grooves instead of the circumferential holes, and that has a agitator shaft-penetrated hole at the center as in the wheel type agitating disc. In the drawing, the disc revolves clockwise. a preferable range of the number of the grooves or the like is substantially the same as in the wheel type agitating disc.

Figure 7:
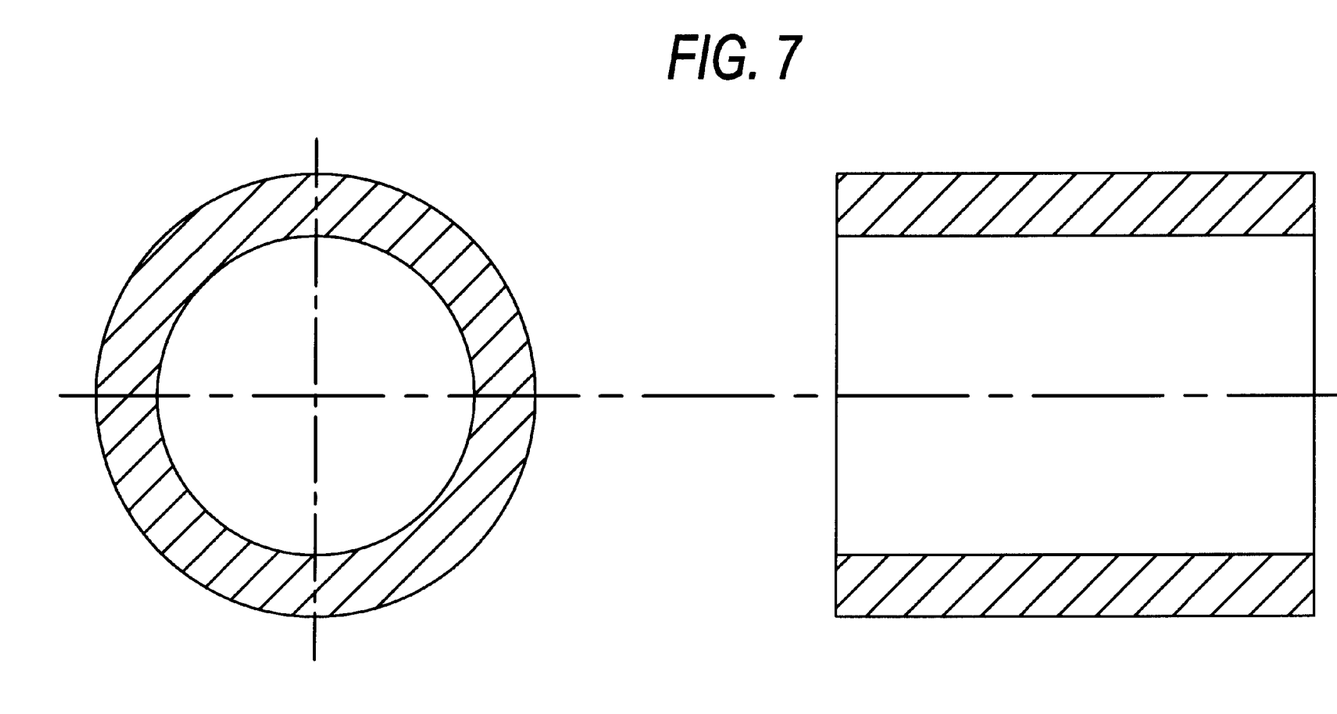
FIG. 7 shows schematically collar for use in a pulverizer of FIG. 1.

Collars disposed between agitating discs will be described with reference to FIG. 7. Since a collar does not need to have so great a resistance to shear as an agitating disc, the sliding against the agitator shaft hardly becomes a problem. Therefore, an agitator shaft-penetrated hole of the collar may be a complete circular shape. However, it is preferred to adjust the size of the hole so that the internal peripheral edge of the collar contacts the agitator shaft. The diameter of the collar is preferably 20–200 mm (or 20–50% of the inside diameter of the pulverizer). The thickness thereof is preferably 15–200 mm.

Property Measurement Method

The average crystal grain diameter, the proportion of tetragonal crystal zirconia, and the Vickers hardness (Hv) of zirconia ceramics produced as described above were determined.

The average crystal grain diameter was determined by polishing a surface of a zirconia ceramic, then etching, and determining a number average of the circle equivalent diameters of crystal grains in a microscopic photograph of an etched surface using an image processing technique.

The proportion of tetragonal crystals was determined by carefully mirror-polishing a surface of a ceramic, and then performing X-ray diffraction analysis. The proportion was determined in accordance with the following expression:

$$T(111)/T(111)+M(111)+M(111^-) \times 100 \text{ [vol. \%]}$$

where T(111) is the integrated intensity of a diffraction peak of the (111) surface of a tetragonal crystal occurring at about 2θ=30.2° in the X-ray diffraction analysis, M(111) is the integrated intensity of a diffraction peak of the (111) surface of a monoclinic crystal occurring at about 2θ=28.2°, and M(111⁻) is the integrated intensity of a diffraction peak of the (111) surface of a monoclinic crystal occurring at about 2θ=31.5°, 1–indicating 1.

For Vickers hardness (Hv), a surface of a ceramic was mirror-polished. A Vickers hardness was then determined in accordance with the following expression:

$$Hv[kgf/mm^2] = 1.85473 \times P/(d \times d)$$

where P [kgf/mm²] is a load for forcing a Vickers indenter into the ceramic surface to form an indentation, and d [mm] is the length of the diagonals of the indentation. After measurement at seven different points, the mean value of five measurements, excluding the maximum and minimum measurements, was determined as the Vickers hardness of the ceramic.

The fracture toughness and bending strength were determined according to JIS R 1607 and JIS R 1601, respectively.

Examples of preferred embodiments of the present invention will be described in detail below. However, the present invention is not limited to the examples described below.

EXAMPLE 1

Pulverizing Media

Zirconium oxychloride of a purity of 99.9% and a yttrium chloride solution were mixed so that the mole ratio after conversion into zirconia to yttria mole ratio became 97.25:2.75. Aluminum chloride was added to the mixture up to 0.375 wt. % in terms of Al₂O₃. From the thus-prepared mixture solution, crystalline hydrated zirconia, i.e., a zirconia precursor, was obtained in an autoclave set to 95° C. The crystalline hydrated zirconia was then fired at 800° C., thereby producing a powder material having an average particle diameter of 0.12 μm.

The powder material was wet-pulverized in pure water for three hours using a media agitating mill, thereby preparing a material having an average aggregate diameter of 0.6 μm. After adding polyvinyl alcohol was added as a binder, the material was sprayed, granulated and dried by a spray drier, thereby obtaining granulated powder of 150 μm in average.

Subsequently, a pulverizing medium was formed by a tumbling granulation method. In this process, while the dried powder material was being tumbled using a rotary container, a liquid was sprayed, thereby producing spherical pellets.

The thus-formed pellets were fired at 1400° C. in the atomsphere for one hour, thereby producing dense sintered articles. Barrelling was performed for finish polish to finish the sintered articles with mirror surfaces having a maximum roughness of 0.03 μm so as to provide the pulverizing medium.

Average crystal grain diameter of $ZrO_2$:0.5 μm
Proportion of tetragonal crystal $ZrO_2$:100 vol. %
Bending strength: 128 kgf/mm$^2$
Fracture toughness value: 7.3 MPa·m$^{-\frac{1}{2}}$ The surface roughness of the sintered articles was measured using an interatomic force microscope. The average surface roughness was 5.4 nm, and the maximum roughness was 76 mn. In the surfaces of balls observed, there was no polish scratch having a width of 0.5 μm or greater, a depth 0.35 μm or greater, and a length of 10 μm or greater.

The crystal structure of sintered articles was analyzed by powder X-ray diffraction. The result was that the structure was tetragonal crystal zirconia containing substantially no monoclinic crystal, the crushing load was 250 Newton for a 0.5 mm diameter, 430 Newton for a 0.7 mm diameter, and 750 Newton for a 1.0 mm diameter.

Agitating Member And/Or Container Member of Pulverizer 70 wt. % of alumina powder having an average particle diameter of 0.5 μm and a purity of 99.8% and 30 wt. % of zirconia powder containing 3 mol % yttria and having an average particle diameter of 1.0 μm were mixed and pulverized in a wet condition in pure water for three hours using a media agitating mill, thereby preparing a material having an average aggregate diameter of 0.6 μm. After adding polyvinyl alcohol as a binder, the material was sprayed, granulated and dried by a spray drier, thereby obtaining mixed powder.

From the mixed powder, pulverizer members of desired configurations were formed by rubber pressing and mold pressing. Vessels, sleeves, screens and agitating pins were formed by a rubber pressing method, and agitating discs were formed by a mold pressing method. In the mold pressing method, the mixed powder was placed in a mold and molded by pressurization of 1000 kgf/mm$^2$ thereby obtaining moldings. In the rubber pressing method moldings of the mixed powder were formed under a pressure of 1000 kgf/mm$^2$.

The moldings were sintered at 1550° C. in the atmosphere for two hours, thereby obtaining alumina-zirconia based composite ceramics.

Average crystal grain diameter of $Al_2O_3$:1.0 μm
Average crystal grain diameter of $ZrO_2$:0.5 μm
Proportion of tetragonal crystal $ZrO_2$:100 vol. %
Vickers hardness (Hv): 1710 kgf/mm$^2$
Bending strength: 85 kgf/mm$^2$
Fracture toughness value: 5.3 MPa·m$^{-\frac{1}{2}}$ A friction test was performed on zirconia-made balls as follows. 200 zirconia-made balls that were surface-polished by barreling and had a diameter of 10 mm were placed in the alumina-zirconia made pot mill of a capacity of 1000 mL, and water and SiC powder having an average particle diameter of 1 μm were also introduced in amounts of 36% and 4%, respectively, of the total weight of the ball members. After operating the pot mill at 100 rpm for 50 hours, the ball weight abrasion loss rate was calculated.

Loss rate by abrasion: 0.06%

EXAMPLE 2

Pulverizing Media

Alumina-zirconia mixed powder as used for the pulverizer members in Example 1 was mixed and pulverized in a wet condition in pure water for three hours using a media agitating mill, thereby preparing a material having an average aggregate diameter of 0.8 μm. After adding polyvinyl alcohol as a binder in an amount of 5 wt. %, the material was sprayed, granulated and dried by a spray drier, thereby obtaining granulated powder of 150 μm in average.

The granulated powder was formed into particles of an average diameters of 0.8 μm by a tumbling granulation method. In this process, while the dried powder material was being tumbled using a rotary container, liquid was sprayed, thereby producing spherical pellets.

The thus-formed pellets were fired at 1550° C. in the atmosphere for one hour, thereby producing dense sintered articles. Finish polish was performed by barreling to form mirror surfaces.

The surface roughness of sintered articles was measured using an interatomic force microscope. The average surface roughness was 7.4 nm, and the maximum roughness was 88 nm. In the surfaces of balls observed, there was no polish scratch having a width of 0.5 μm or greater, a depth of 0.35 μm or greater, and a length of 10 μm or greater.

The crystal structure of sintered articles was analyzed by powder X-ray diffraction. The result was that the structure was tetragonal crystal zirconia containing substantially no monoclinic crystal, the crushing load was 220 Newton for a 0.5 mm diameter, 390 Newton for a 0.7 mm diameter, and 710 Newton for a 1.0 mm diameter.

Agitating Member And/Or Container Member of Pulverizer 0.5 wt. % of MgO and 0.2 wt. % of $SiO_2$ were added to alumina powder of an average particle diameter of 0.17 μm. The powder was mixed with 5 wt. % of polyvinyl alcohol as a binder and pure water as a solvent, thereby preparing a slurry.

The slurry was then mixed and pulverized in a wet condition in pure water for three hours using a media agitating mill, thereby preparing a material having an average aggregate diameter of 0.6 μm. After adding polyvinyl alcohol as a binder, the material was sprayed, granulated and dried by a spray drier, thereby obtaining mixed powder.

Pulverizer members of desired configurations were formed by mold pressing and/or rubber pressing as in Example 1.

The meldings were fired at 1600° C. in the atmosphere for two hours, thereby obtaining dense alumina sinteted articles.

Average crystal grain diameter of alumina: 1.8 μm
Vickers hardness (Hv): 1850 kgf/mm$^2$
Bending strength: 47 kgf/mm$^2$
Fracture toughness value: 3.9 MPa·m$^{-\frac{1}{2}}$ A friction test was performed on alumina-zirconia made balls as follows. 200 alumina-zirconia made balls that were surface-polished by barreling and had a diameter of 10 mm were placed in an alumina-made pot mill of a capacity of 1000 mL, and water and SiC powder having an average particle diameter of 1 μm were also introduced in amounts of 36% and 4%, respectively, of the total weight of the ball members. After operating the pot mill at 100 rpm for 50 hours, the ball weight abrasion loss rate was calculated.

Loss rate by abrasion: 0.09%

EXAMPLE 3

Pulverizing Media 0.75 wt. % of B, 2.5 wt. % of C and 10 wt. % of a metallic silicon were added to silicon carbide powder of an average particle diameter of 0.12 μm. The powder was slurried by adding 5 wt. % of polyvinyl alcohol as a binder and using pure water as a solvent.

The slurry was then mixed and pulverized in a wet condition in pure water for three hours using a media agitating mill, thereby preparing a material having an average aggregate diameter of 0.8 μm. After adding 5 wt. % of polyvinyl alcohol as a binder, the material was sprayed, granulated and dried by a spray drier, thereby obtaining granulated powder of 120 μm in average.

The granulated powder was formed into particles of an average diameter of 0.8 μm by a tumbling granulation method. In this process, while the dried powder material was being tumbled using a rotary container, a liquid was sprayed, thereby producing spherical pellets.

The thus-formed pellets were fired at 1700° C. in an argon atmosphere for one hour, thereby producing dense sintered articles. Finish polishing was performed by barreling to form mirror surfaces.

The surface roughness of sintered articles was measured using an interatomic force microscope. The average surface roughness was 10.5 nm, and the maximum roughness was 90 nm. In the surfaces of balls observed, there was no polish scratch having a width of 0.5 μm or greater, a depth of 0.35 μm or greater, and a length of 10 μm or greater.

In the X-ray diffraction analysis of sinteed samples, characteristic X-ray peaks of β-SiC, C and Si were observed in the matrix.

Average crystal grain diameter of pulverizing media: 1.2 μm

Vickers hardness (Hv): 2350 kgf/mm$^2$

Bending strength: 33 kgf/mm$^2$

Fracture toughness value: 5.5 MPa·m$^{-\frac{1}{2}}$

Pulverizer Members 0.75 wt. % of B, 2.5 wt. % of C and 10 wt. % of Al$_2$O$_3$ were added to silicon carbide powder of an average particle diameter of 0.12 μm. The powder was slurried by adding 5 wt. % of polyvinyl alcohol as a binder and using pure water as a solvent. The slurry was then mixed and pulverized in a wet condition in pure water for three hours, thereby preparing a material having an average aggregate diameter of 0.9 μm. After adding polyvinyl alcohol as a binder, the material was sprayed, granulated and dried by a spray drier, thereby obtaining mixed powder.

Pulverizer members of desired configurations were formed by mold pressing and/or rubber pressing as in Example 1.

The moldings were fired at 2150° C. in an argon atmosphere for three hours, thereby obtaining dense sintered articles.

Average crystal grain diameter of SiC: 2.2 μm

Vickers hardness (Hv): 2700 kgf/mm$^2$

Bending strength: 55 kgf/mm$^2$

Fracture toughness value: 3.5 MPa·m$^{-\frac{1}{2}}$

A friction test was performed on balls made of the metallic silicon-containing silicon carbide, as follows. 200 metallic silicon-containing silicon carbide balls that were surface-polished by barreling and had a diameter of 10 mm were placed in an SiC-made pot mill of a capacity of 1000 mL, and water and SiC powder having an average particle diameter of 1 μm were also introduced in amounts of 36% and 4%, respectively, of the total weight of the ball members. After operating the pot mill at 100 rpm for 50 hours, the ball weight abrasion loss rate was calculated.

Loss rate by abrasion: 0.08%

EXAMPLE 4

Pulverizing Media

Alumina-zirconia mixed powder as used for the pulverizing media in Example 2 was formed into particles having an average diameter of 1.2 mm, by a tumbling method.

The molding were fired at 1550° C. in the atmosphere for one hour, thereby obtaining dense sintered articles. Barreling was performed for finish polishing to form mirror surfaces.

the surface roughness of sintered articles was measured using an interatomic force microscope. The average surface roughness was 7.7 nm, and the maximum roughness was 68 nm. In the surfaces of balls observed, there was no polish scratch having a width of 0.5 μm of greater, a depth of 0.35 μm or greater, and a length of 10 μm or greater.

The properties of the sintered articles were substantially the same as in Example 2.

Pulverizer Members 80 wt. % of alumina powder having an average particle diameter of 0.5 μm and a purity of 99.8% and 20 wt. % of zirconia powder containing 3 mol % yttria and having an average particle diameter of 1.0 μm were mixed and pulverized in a wet condition in pure water for three hours using a media agitating mill, thereby preparing a material having an average aggregate diameter of 0.6 μm. After adding polyvinyl alcohol as a binder, the material was sprayed, granulated and dried by a spray drier, thereby obtaining mixed powder.

From the mixed powder, pulverizer members of desired configurations were formed by rubber pressing and mold pressing, as Example 1. Vessels, sleeves, screens and agitating pins were formed by a rubber pressing method, and agitating discs were formed by a mold pressing method. The vessels were reinforced by sticking to external surfaces thereof a commmposite fibrous material of 10 mm in thickness obtained by impregnating a Kevler weave with epoxy resin.

The moldings were sintered at 1550° C. in the atmosphere for two hours, thereby obtaining alumina-zirconia based composite ceramics. The vessels were reinforced by sticking to external surfaces thereof a composite fibrous material of 10 mm in thickness obtained by impregnating a Kevler weave with epoxy resin.

Average crystal grain diameter of Al$_2$O$_3$:1.2 μm

Average crystal grain diameter of ZrO$_2$:0.6 μm

Proportion of tetragonal crystal ZrO$_2$:95 vol. %

Vickers hardness (Hv): 1680 kgf/mm$^2$

A friction test was performed on pulverizing media made of alumina-zirconia, as follows. 200 alumina-zirconia made balls that were surface-polished by barreling and had a diameter of 15 mm were placed in the alumina-zirconia made pot mill of a capacity of 1000 mL, which is a pulverizer member, and water and SiC powder having an average particle diameter of 1 μm were also introduced in amounts of 36% and 4%, respectively, of the total weight of the media members. After operating the pot mill at 100 rpm for 50 hours, the ball weight abrasion loss rate was calculated.

Loss rate by abrasion: 0.12%

EXAMPLE 5

Pulverizing Media

After preparation of powder and granulation as in Example 1, disc-shaped pulverizing media members were formed by a rotary press method.

The green configuration of the pulverizing media was 15 mm in diameter and 15 mm in height. The area of flat portions is 33% of the entire surface area. The aspect ratio (height/diameter) was 1.

After firing at 1400° C., the surface roughness of the media members was measured by an interatomic force microscope. The average surface roughness was 5.1 nm, and the maximum roughness was 74 nm. In the surfaces of balls observed, there was no polish scratch having a width of 0.5 μm or greater, a depth of 0.35 μm or greater, and a length of 10 μm or greater.

Agitating Member And/Or Container Member of Pulverizer 80 wt. of alumina powder having an average particle diameter of 0.5 μ and a purity of 99.8% and 20 wt. % of zirconia powder containing 3 mol % yttria and having an average particle diameter of 1.0 μm were mixed and pulverized in a wet condition in pure water for three hours using a media agitating mill, thereby preparing a material having an average aggregate diameter of 0.6 μm. After adding polyvinyl alcohol as a binder, the material was sprayed granulated and dried by a spray drier, thereby obtaining mixed powder.

From the mixed powder, pulverizer members of desired configuarations were formed by rubber pressing and mold pressing, as Example 1. Vessels, sleeves, screens and agitating pins were formed by a rubber pressing method, and agitating discs were formed by a mold pressing method. The vessels were reinforces by sticking to external surfaces thereof a composite fibrous material of 10 mm in thickness obtained by impregnating a Kevler weave with epoxy resin.

The moldings were sintered at 1550° C. in the atmosphere for two hours, thereby obtaining alumina-zirconia based composite ceramics. The vessels were reinforced by sticking to external surfaces thereof a composite fibrous material of 10 mm in thickness obtained by impregnating a Kevler weave with epoxy resin.

Average crystal grain diameter of $Al_2O_3$:1.2 μm

Average crystal grain diameter of $ZrO_2$:0.6 μm

Proportion or tetragonal crystal $ZrO_2$:95 vol. %

Vickers hardness (Hv): 1680 kgf/mm$^2$

A friction test was performed on pulverizing media made of the zirconia, as follows. 200 zirconia-made media balls that were surface-polished by barrelling and had a diameter of 15 mm were placed in the alumina-zirconia made pot mill of a capacity of 1000 mL, and water and SiC powder having an average particle diameter of 1 μm were also introduced in amounts of 36% and 4%, respectively, of the total weight of the media members. After operating the pot mill at 100 rpm for 50 hours, the ball weight abrasion loss rate was calculated.

Loss rate by abrasion: 0.15%

EXAMPLE 6

Pulverizing Media

Zirconia-made beads were produced by substantially the same method as in Example 1.

Agitating Member And/Or Container Member of Pulverizer

Alumina-zirconia based ceramics were produced and evaluated in substantially the same manner as in Example 1, except that the content of $Y_2O_2$, i.e., a stabilizer, in $ZrO_2$ was 2 mol %.

The test results are as follows:

Average crystal grain diameter of $Al_2O_3$:1.0 μm

Average crystal grain diameter of $ZrO_2$:0.6 μm

Proportion of tetragonal crystal $ZrO_2$:0.6 μm

Vickers hardness (Hv): 1700 kgf/mm$^2$

Loss rate by abrasion: 0.21%

EXAMPLE 7

Pulverizing Media

Zirconia-made beads were produced by substantially the same method as in Example 1.

Agitating Member And/Or Container Member of Pulverizer

Alumina-zirconia based ceramics were produced and evaluated in substantially the same manner as in Example 1, except that the content of $Y_2O_2$, i.e., a stabilizer, in $ZrO_2$ was 4.5 mol %.

The test results are as follows:

Average crystal grain diameter of $Al_2O_3$:1.1 μm

Average crystal grain diameter of $ZrO_2$:0.5 μm

Proportion of tetragonal crystal $ZrO_2$:96 vol. %

Vickers hardness (Hv): 700 kgf/mm$^2$

Loss rate by abrasion: 0.25%

EXAMPLE 8

Pulverizing Media

Zirconia-made beads were produced by substantially the same method as in Example 1.

Agitating Member And/Or Container Member of Pulverizer

Alumina-zirconia based ceramics were produced and evaluated in substantially the same manner as in Example 1, except that the firing temperatue was 1600° C.

The test results are as follows:

Average crystal grain diameter of $Al_2O_3$:1.3 μm

Averager crystal grain diameter of $ZrO_2$:0.6 μm

Proportion of tetragonal crystal $ZrO_2$:100 vol. %

Vickers hardness (Hv): 1700 kgf/mm$^2$

Loss rate by abrasion: 0.11%

Pulverizing Media

Zirconia-made beads were produced by substantially the same method as in Example 2.

Agitating Member And/Or Container Member of Pulverizer

Alumina-zirconia based ceramics were produced and evaluated in substantially the same manner as in Example 1.

The test results are as follows:

Average crystal grain diameter of $Al_2O_3$:1.0 μm

Average crystal grain diameter of $ZrO_2$:0.3 μm

Proportion of tetragonal crystal $ZrO_2$:100 vol. %

Vickers hardness (Hv): 1710 kgf/mm$^2$

Loss rate by abrasion: 0.65%

COMPARATIVE EXAMPLE 2

Pulverizing Media

Zirconia-made beads were produced by substantially the same method as in Example 1.

Agitating Member And/Or Container Member of Pulverizer

Alumina-zirconia based members were produced and evaluated in substantially the same manner as in Example 4, except that no reinforcement was provided The test results are as follows:

Loss rate by abrasions: 0.25%

Falling-off by breaking was observed on an internal surface of the vessel.

We claim:

1. A pulverizer for pulerizing a product, which pulverizer comprises (a) a container, (b) a pulverizing medium within the container and (c) optionally at least one working part associated with the pulverizer and within the container, wherein at least one of (1) an outer shell of the working part of the pulverizer, (2) an outer shell of the pulverizing medium and (3) an inner lining of the container is formed from a composite ceramic material comprising at least 50 wt %, based on the weight of the ceramic material, of a crystalline aluminum oxide material and 15–40 wt % based on the weight of the ceramic material, of a crystalline zirconium oxide material, said crystalline zirconium oxide material contains additionally at least one of $Y_2O_3$ or $CeO_2$ in an amount of 0.1–5 mol %, based on the total crystalline zirconium oxide material.

2. A pulverizer according to claim 1, wherein the composite ceramic material contains from 60–85 wt. % of the crystalline aluminium oxide material.

3. A pulverizer according to claim 2, wherein the composite ceramic material comprises from 65–75 wt. % of the crystalline aluminium oxide material and from 25–35 wt. % of the crystalline zirconium oxide material.

4. A pulverizer according to claim 1, wherein the composite ceramic material is a material in which at least one of the zirconium oxide and aluminum oxide materials has an average crystal grain diameter of no more than 2 μm, and in which at least 50% by volume of the zirconium oxide material is present as tetragonal crystals.

5. A pulverizer according to claim 1, wherein the amount of the crystalline zirconium oxide material in the composite ceramic material is 20–35 wt. %.

6. A pulverizer according to claim 1, wherein $Y_2O_3$ is present in a crystalline zirconium oxide material in an amount of 2–3.5 mol %.

7. A pulverizer according to claim 1, wherein at least 95% by volume of the zirconium oxide material is present as tetragonal crystals.

8. A pulverizer according to claim 1, wherein the crystalline zirconium oxide material has an average crystal grain diameter of 0.2–0.8 μm, and the crystalline aluminum oxide material has an average crystal grain diameter of 0.5–1.5 μm.

9. A pulverizer according to claim 1, wherein at least one of (1) an outer shell of a working part of the pulverizer and (2) an inner liner of the container is formed from a composite ceramic material in which the content of the said at least one $Y_2O_3$ or $CeO_2$; and is 0.1–2 mol %, based on the total zirconium oxide material, and wherein the container contains a pulverizing medium, which pulverizing medium is formed from a composite ceramic material in said a crystalline zirconium oxide material is present in the ceramic material in an amount of at least 50 wt. %, based on the weight of the total pulverizing medium and a crystalline aluminum oxide material is present in an amount of at most 40 wt. %, based on the weight of the total pulverizing medium, and at least one of $Y_2O_3$ or $CeO_2$; and is present in the zirconium oxide material in amount of 1.5–5 mol %, based on the total crystalline zirconium oxide material.

10. A pulverizer according to claim 1, wherein at least one (1) an outer shell of a working part of the pulverizer and (2) an inner liner of the container is formed from a composite ceramic material in which the aluminum oxide content is 30–70 wt. %, by weight of the total ceramic material, and the residue is tetragonal crystal zirconia, and wherein the pulverizing medium is formed from a zirconia in which at least 90% by volume of the zirconia is of tetragonal crystals and substantially no monoclinic crystal is present.

11. A pulverizer according to claim 1, wherein the composite ceramic material has a Vickers hardness (Hv) of at least 1300 kgf/mm² (12.75 GPa).

12. A pulverizer according of claim 11, wherein the composite ceramic material has a Vickers hardness (Hv) of at least 1650 kgf/mm² (16.2 GPa).

13. A pulverizer comprising:
at least one of a working part of the pulverizer or a container of the pulverizer having a Vickers hardness (Hv) of at least 1300kgf/mm² (12.75 GPa), and
a pulverizing medium whose Vickers hardness (Hv) is 100–600 kgf/mm² (1–6 GPa) lower than that of the Vickers hardness of at least one of the working part or the container.

14. A pulverizer according to claim 13, wherein the pulverising medium has a Vickers hardness (Hv) of 100–500 kgf/mm² (1–5 GPa) lower than that of the Vickers hardness of the at least one of the working part and the container.

15. A pulverizer according to claim 14, wherein the pulverizing medium has a Vickers hardness (Hv) of 200–200 kgf/mm² (2–4GPa) lower than that of the Vickers hardness of the at least one of the working part and the container.

16. A pulverizer according to any one of claims 13, wherein the Vickers hardness (Hv) of the at least one of the working part and the container is at least 1650kgf/mm² (16.2 GPa).

17. A pulverizer according to claim 1, wherein a composite ceramic material of at least one of a working part of the pulverizer, the container of the pulverizer and a pulverizer medium in the pulverizer has a bend strength of at least 65 kgf/mm² (0.65GPa).

18. A pulverizer according to claim 1 or 13, wherein at least one of a working part of the pulverizer and the container is formed from a ceramic material having a fracture toughness value, determined by a single-edge-precracked-beam method according to JIS R 1607, of 3–10 MPa·m$^{1/2}$, wherein the pulverizing medium is formed from a ceramic material having a fracture toughness value of 4–20 MPa·m$^{1/2}$.

19. A pulverizer according to claim 1 or 13, wherein pulverizing medium in the pulverizer comprises a plurality of cylindrical pellets having a diameter of 0.5–15 mm and an aspect ratio of a height to the diameter of 0.5–2.

20. A pulverizer according to claim 1 or 13, wherein an external surface of the container is protected with an impact absorbing material formed from at least one of metal, plastic and wood.

21. A pulverizer according to claim 1 or 13, wherein at least one said working part thereof is an agitating member.

22. A pulverizing medium selected from
(a) a ceramic material formed from a composite material containing a crystalline aluminum oxide material present in the ceramic material in an amount of at least 50 wt. %, based on the weight of the total pulverizing medium, and a crystalline zirconium oxide material in an amount of 15–40 wt. %, based on the weight of the total pulverizing medium, said crystalline zirconium oxide material contains additionally at least one of $Y_2O_3$ or $CeO_2$ in an amount of 0.1–5 mol %, based on the total crystalline zirconium oxide material; and
(b) a ceramic material having a Vickers hardness (Hv) of at least 1300 kgf/mm² (2.75 GPa);
said pulverizing medium additionally has at least one of the following features:
(a) a maximum surface roughness of no more than 0.1 μm and an average roughness of no more than 0.02 μm with respect to a given 40 μm-long line that is provided on the surface;
(b) the number of polish scratches of at least 0.5 μm in width, at least 0.2 μm in depth and at a least 10 μm in length that are present in a given 50 μm×50 μm square on a surface of the pulverizing medium is at most two; and (c) a flat portion whose area is 20–50% of an entire surface area of the pulverizing medium.

23. A method of pulverizing a product, comprising the steps of:
(1) selecting a pulverizing medium of,
   (a) a ceramic material formed from a composite material containing a crystalline alunimun oxide material present in the ceramic material in an amount of at least 50 wt. %, based on the weight of the total pulverizing medium, and a crystalline zirconium oxide material in an amount of 15–40 wt. %, based on the weight of the total pulverizing medium, said crystalline zirconium oxide material contains additionally at least one of $Y_2O_3$ or $CeO_2$ in an amount of 0.1–5 mol %, based on the total crystalline zirconium oxide material; and
   (b) a ceramic material having a Vickers hardness (Hv) of at least 1300 kgf/mm(2.75 Gpa);
said pulerizing medium additionally has at least one of the following features:
   (a) a maximum surface roughness of no more than 0.1 $\mu$m and an average roughnes of no more than 0.2 $\mu$m with respect to a given 40 $\mu$m-long line that is provided on the surface;
   (b) the number of polish scratches of at least 0.5 $\mu$m in width, at least 0.2 $\mu$m in depth and at least 10 $\mu$m in length that are present in a given 50 $\mu$m×50 $\mu$m square on a surface of the pulverizing medium is at most two; and
   (c) a flat portion whose are is 20–50% of an entire surface area of the pulverizing medium; and
(2) agitating the product in the presence of said pulverizing medium so as to pulverize said product.

24. A sintered composite ceramic material comprising a crystalline aluminium oxide material and a crystalline zirconium oxide material, said crystalline aluminium oxide material is present in an amount of from 60–85 wt. %, and said crystalline zirconium material is present in an amount of 15–40 wt. %, based on the total weight of the composite ceramic material, and said crystalline zirconium oxide material contains additionally at least one of $Y_2O_3$ or $CeO_2$ in an amount of 0.1–5 mol % based on the total zirconium oxide material.

25. An agitating member suitable for use in a media agitating pulverizer, wherein at least an outer shell of said agitating member comprises a ceramic composite material comprising at least 50 weight percent of a crystalline aluminum oxide material, based on the total weight of the ceramic composite material, and 15–40 weight percent of a crystalline zirconium oxide material, based on the total weight of the ceramic composite material, wherein said crystalline zirconium oxide material contains additionally at least one of $Y_2O_3$ or $CeO_2$ in an amount of 0.1–2 mol %, based on the total amount of said crystalline zirconium oxides in said ceramic composite material.

26. A container member suitable suitable for use in a media agitating pulverizer, wherein at least an inner liner of said container member comprises a ceramic composite material comprising at least 50 weight percent of a crystalline aluminum oxide material, based on the total weight of the ceramic composite material, and 15–40 weight percent of a crystalline zirconium oxide material, based on the total weight of the ceramic composite material, wherein said crystalline zirconium oxide material contains additionally at least one of $Y_2O_3$ or $CeO_2$ in an amount of 0.1–2 mol %, based on the total amount of said crystalline zirconium oxides in said ceramic composite material.

27. A method of pulverizing a product, comprising the steps of:
selecting an agitating member of which at least an outer shell comprises a ceramic composite material comprising at least 50 weight percent of a crystalline aluminum oxide material, based on the total weight of the ceramic composite material, and 15–40 weight percent of a crystalline zirconium oxide material, based on the total weight of the ceramic composite material, wherein said crystalline zirconium oxide material contains additionally at least one of $Y_2O_3$ or $CeO_2$ in an amount of 0.1–2 mol %, based on the total amount of said crystalline zirconium oxides in said ceramic composite material; and
(2) agitating the product in the presence of said agitating member so as to pulverize said product.

28. A method of pulverizing a product, comprising the steps of:
(1) selecting a container member of which at least an inner liner comprises a ceramic composite material comprising at least 50 weight percent of a crystalline aluminum oxide material, based on the total weight of the ceramic composite material, and 15–40 weight percent of a crystalline zirconium oxide material, based on the total weight of the ceramic composite material, wherein said crystalline zirconium oxide material contains additionally at least one of $Y_2O_3$ or $CeO_2$ in an amount of 0.1–2 mol %, based on the total amount of said crystalline zirconium oxides in said ceramic composite material; and
(2) agitating the product in the presence of said container member to pulverize said product.

29. A method of pulverizing a product, comprising the steps of:
(1) selecting a pulverizer comprising a container, a pulverizing medium within the container and optionally at least one working part associated with the pulverizer and within the container, wherein at least one of an outer shell of the working part of the pulverizer, an outer shell of the pulverizing medium and an inner lining if the container is formed from a ceramic composite material comprising at least 50 weight percent of a crystalline aluminum oxide material, based on the total weight of the ceramic composite material, and 15–40 weight percent of a crystalline zirconium oxide material, based on the total weight of the ceramic composite material, wherein said crystalline zirconium oxide material contains additionally at least one $Y_2O_3$ or $CeO_2$ in an amount of 0.1–2 mol %, based on the total amount of said crystalline zirconium oxides in said ceramic composite material; and
(2) agitating the product in the presence of said pulverizing medium within said pulverizer to pulverize said product.

30. A method of pulverizing a product, comprising the steps of:
(1) selecting a pulverizer comprising a working part and a container, at least one said working part and container having a Vickers hardness (Hv) of at least 1300 kgf/mm$^2$ (12.75 GPa), and a pulverizing medium whose Vickers hardness (Hv) is 100–600 kgf/mm$^2$ (1–6 GPa) lower than the Vickers hardness of at least one of the working part and the container; and
(2) agitating the product in said pulverizer to pulverize said product.

* * * * *